(12) United States Patent  
Choi et al.

(10) Patent No.: US 8,097,304 B2  
(45) Date of Patent: Jan. 17, 2012

(54) METHOD OF FORMING NANO-PARTICLE ARRAY BY CONVECTIVE ASSEMBLY, AND CONVECTIVE ASSEMBLY APPARATUS FOR THE SAME

(75) Inventors: Hyuk-soon Choi, Gyeonggi-do (KR); Hyo-sug Lee, Gyeonggi-do (KR); June-mo Koo, Gyeonggi-do (KR); Kwang-hee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1026 days.

(21) Appl. No.: 11/567,926

(22) Filed: Dec. 7, 2006

(65) Prior Publication Data

US 2007/0190240 A1    Aug. 16, 2007

(30) Foreign Application Priority Data

Feb. 8, 2006    (KR) .................. 10-2006-0012033

(51) Int. Cl.
*B05D 5/00* (2006.01)

(52) U.S. Cl. ............ 427/256; 427/212; 427/372.2; 427/429; 427/434.2; 427/434.3; 428/141; 428/143; 428/156; 428/167; 428/173

(58) Field of Classification Search .......... 427/256, 427/212, 372.2, 429, 434.2, 434.3; 428/173, 428/141, 143, 156, 167

See application file for complete search history.

(56) References Cited

U.S. PATENT DOCUMENTS

| | | | |
|---|---|---|---|
| 2002/0023894 A1* | 2/2002 | Rossi | 216/2 |
| 2002/0078892 A1* | 6/2002 | Takahashi | 118/719 |
| 2002/0176988 A1* | 11/2002 | Medwick et al. | 428/408 |
| 2003/0166297 A1* | 9/2003 | Natan | 436/166 |
| 2004/0005258 A1* | 1/2004 | Fonash et al. | 422/271 |
| 2005/0000816 A1* | 1/2005 | Lin et al. | 205/78 |
| 2006/0003097 A1* | 1/2006 | Andres et al. | 427/212 |

FOREIGN PATENT DOCUMENTS

KR    1020010019448 A    3/2001

(Continued)

OTHER PUBLICATIONS

Mun Ho Kim, Sang Hyuk Im, and O Ok Park; Rapid Fabrication of Two- and Three-Dimensional Colloidal Crystal Films via Confined Convective Assembly; Advanced Functional Material 2005, 15, 1329-1335; Received Dec. 22, 2005; Final version: Mar. 28, 2005.

*Primary Examiner* — Michael Cleveland  
*Assistant Examiner* — Xiao Zhao  
(74) *Attorney, Agent, or Firm* — Cantor Colburn LLP

(57) ABSTRACT

A method of forming a nano-particle array by convective assembly and a convective assembly apparatus for the same are provided. The method of forming nano-particle array comprises: coating a plurality of nano-particles by forming a coating layer; performing a first convective assembly by moving a first substrate facing, in parallel to and spaced apart from a second substrate at a desired distance such that a colloidal solution including the coated nano-particles is between the first and second substrate; and performing a second convective assembly for evaporating a solvent by locally heating a surface of the colloidal solution drawn when the first substrate is moved in parallel relative to the second substrate. The present invention provides the method of forming the nano-particle array where nano-particles having a particle size from a few to several tens of nanometers are uniformly arrayed on a large area substrate at a low cost, and the convective assembly apparatus for the same.

16 Claims, 11 Drawing Sheets

FOREIGN PATENT DOCUMENTS

| | | |
|---|---|---|
| KR | 1020020020474 A | 3/2002 |
| KR | 1020040059588 A | 7/2004 |
| KR | 1020040075116 A | 8/2004 |
| KR | 102005000354 A | 1/2005 |
| KR | 1020050075073 A | 7/2005 |

* cited by examiner

METHOD OF FORMING NANO-PARTICLE ARRAY BY CONVECTIVE ASSEMBLY, AND CONVECTIVE ASSEMBLY APPARATUS FOR THE SAME

CROSS-REFERENCE TO RELATED PATENT APPLICATION

This application claims the benefit of Korean Patent Application No. 10-2006-0012033, filed on Feb. 8, 2006, in the Korean Intellectual Property Office, the contents of which are hereby incorporated in their entirety.

BACKGROUND OF THE INVENTION

1. Field of the Invention

The present invention relates to a method of forming a uniform nano-particle array on a large area substrate, and more particularly, to a method of forming a nano-particle array by convective assembly, and a convective assembly apparatus for the forming the same.

2. Description of the Related Art

Nano technology is used for arraying nano-particles particle size that are a few nanometers to several tens of nanometers in size on a large area with a uniform surface density. This core technology is very useful in various fields such as information storage devices, memory devices, lighting devices, opto-electronics devices, and the like. For example, the technology of arraying quantum dots, including semiconductor compounds, can be used for various kinds of displays such as lighting devices; and the technology of arraying metal particles such as Au, Ag and Fe is highly likely to be used in the fields of information storage or memory devices. Much research for producing nano-particle arrays is being conducted and in progress, but there are still lots of difficulties in actually producing nano-particle arrays in large quantities because it is the process that requires high precision and incurs high costs. An article in Advanced Functional Material 2005, 15, 1329-1335 to Kim et al. has disclosed a method of forming a nano-particle array by convective assembly. The nanoparticle array disclosed in the aforementioned reference is of the particle size of several hundreds of nanometers. The method of making such a large array is therefore not suitable for arrays particle size of nano-particles having a particle size from a few to several tens of nanometers. Specifically, in the aforementioned reference, high temperature dry air is injected into a colloidal solution to evaporate the colloidal solution and to cohere the included nano-particles. When the high temperature dry air is injected directly into the colloidal solution, the array of nano-particles splits due to the injection pressure and the surrounding turbulent flow of air caused by the injection pressure.

SUMMARY OF THE INVENTION

The present invention provides a method of forming a uniform nano-particle array having a size from a few to several tens of nanometers on a large area substrate by a convective assembly of the nano-particles. It is also directed to a convective assembly apparatus for accomplishing the same.

The present invention also provides a method of forming a uniform nano-particle array on a large substrate by convective assembly, and a convective assembly apparatus for the same.

The present invention further provides a method of forming a nano-particle array by convective assembly to obtain a nano-particle monolayer or multilayer at a low cost and a convective assembly apparatus for the same.

According to an aspect of the present invention, there is provided a method of forming a nano-particle array by convective assembly, comprising: coating for forming a coating layer on nano-particles; performing first convective assembly for parallel moving a first substrate which faces a second substrate at a desired space for movement such that a colloidal solution including a number of the coated nano-particles is positioned between the first and second substrates; and performing second convective assembly for evaporating a solvent by heating locally a surface of the colloidal solution drawn when the first substrate is moved.

According to another aspect of the present invention, there is provided a convective assembly apparatus for forming nano-particle array, comprising: a tank containing a colloidal solution including a plurality of nano-particles; a first substrate and a second substrate which are partially put in the tank and positioned to face each other at a desired space for movement; a lift-up unit for raising up the first substrate at a desired lift-up speed; and a heating unit for heating locally a surface of the colloidal solution drawn when the first substrate is raised.

According to another aspect of the present invention, there is provided a convective assembly apparatus for forming nano-particle array, comprising: a fixed cover including an opening for supplying a colloidal solution including a plurality of nano-particles; a sliding substrate positioned under the fixed cover, to face each other in parallel, spacing apart from each other at a desired space for movement; at least one driving roller for moving the sliding substrate at a constant speed; and a heating unit for heating locally a surface of the colloidal solution drawn when the sliding substrate is moved.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A method of forming a nano-particle array by convective assembly and a convective assembly apparatus for the same will now be described more fully hereinafter with reference to the accompanying drawings.

Figure 1:
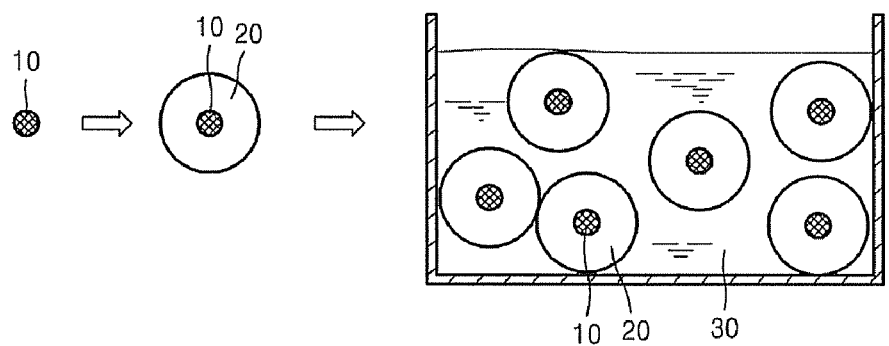
FIG. 1 is an exemplary outline view illustrating a part of a process applied to a method of forming a nano-particle array according to an embodiment of the present invention.

FIG. 1 is an outline view illustrating a part of a process applied to a method of forming a nano-particle array according to an embodiment of the present invention.

Referring to FIG. 1, a coating layer 20 having a desired thickness is formed on a nano-particle 10 having a particle size from a few to several tens of nanometers. The coated nano-particle having a particle size of several hundreds of nanometers becomes suitable for convective assembly as will be described later. A plurality of nano-particles 10 that have been coated through a coating process are included in a colloidal solution 30, and are arrayed in two-dimensions or three-dimensions on a substrate by a convective assembly. In this specification, the nano-particles 10 encompass all the nano-particles such as quantum dots including semiconductor compounds or metallic particles such as Au, Ag, Fe, Co, Ni, Pd, and the like.

Figure 2A:
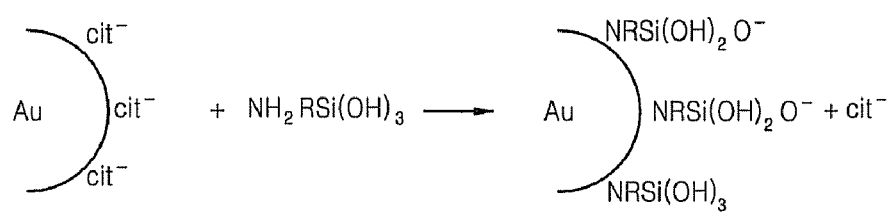
FIGS. 2A and 2B are exemplary views illustrating a process of coating nano-particles in the method according to an embodiment of the present invention.
Figure 2B:
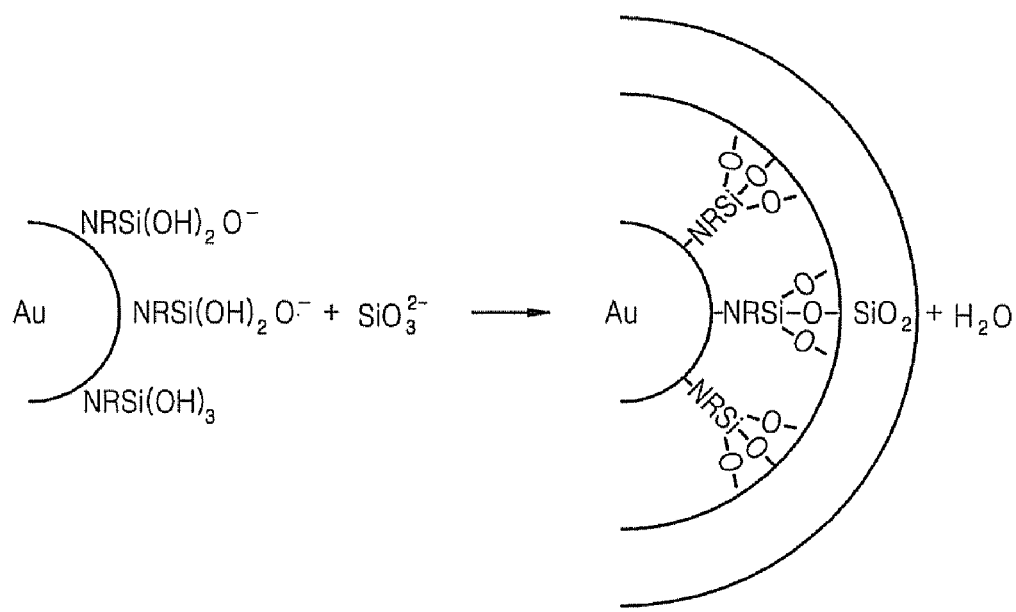

FIGS. 2A and 2B are views illustrating a process of coating nano-particles 10 in the method according to an embodiment of the present invention.

Referring to FIGS. 2A and 2B, a method of coating a gold (Au)-particles with silicon dioxide ($SiO_2$) will be described as an embodiment of a method of forming a coating layer on a nano-particle. As illustrated in FIG. 2A, a 3-aminopropyl tri-methoxysilane solution (APS) solution is added to a colloidal solution containing the Au-particles obtained by a sodium citrate reduction method, and is stirred for a predetermined time, so that a primer layer comprising amino groups is formed on the surface of the Au-particles. The primer layer acts as a seed for growing $SiO_2$. A primer may be suitably selected to control the adhesion between the nano-particles and the coating layer formed on the nano-particles.

In FIG. 2B, an active silica solution is added to and stirred with the colloidal solution containing the Au-particles to form a coating layer that comprises the active silica on the surface of the Au-particle. The active silica is continuously added during the stirring until a silica-coating layer having a desired thickness is formed on the nanoparticles. The speed at which the coating layer grows is closely related to the density of the active silica. The coating layer acts as a dispersant or surfactant, so that the nano-particles do not adhere together in the colloidal solution and are uniformly dispersed in a solvent by van der Waals forces. The above-described silica coating method is not limited to the silica coating method but can be used to apply other coatings. For example, the emulsion polymerization method by which a polymer coating layer is obtained from a water solution emulsion where a monomer and a surfactant are mixed may be applied for coating the nano-particles.

Figure 3A:
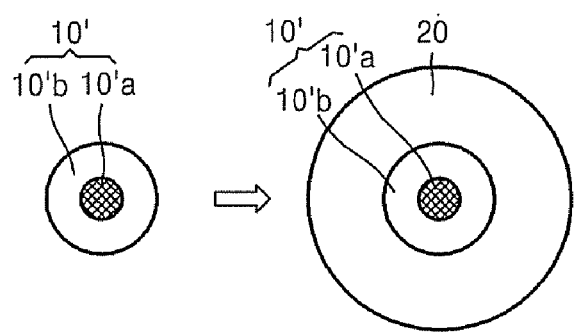
FIGS. 3A and 3B are exemplary sectional views illustrating when a coating layer is formed on a nano-particle having a quantum dot as a structure, according to an embodiment of the present invention.
Figure 3B:
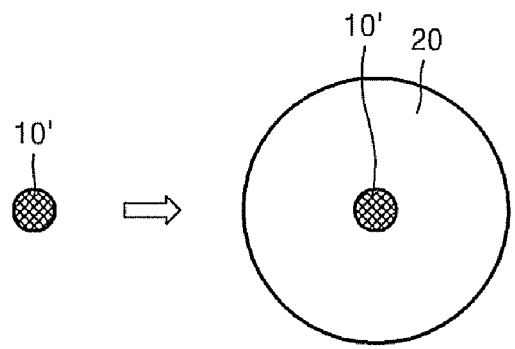

Each of FIGS. 3A and 3B illustrates a sectional structure of a quantum dot 10' on which a coating layer 20 is formed. A quantum dot 10 generally has a diameter of about 1 nm to about 10 nm (nanometers). The quantum dot 10' may have a dual structure including a core 10'$a$ and a shell 10'$b$ as shown in FIG. 3A or a homogeneous single structure as shown in FIG. 3B.

Figure 4:
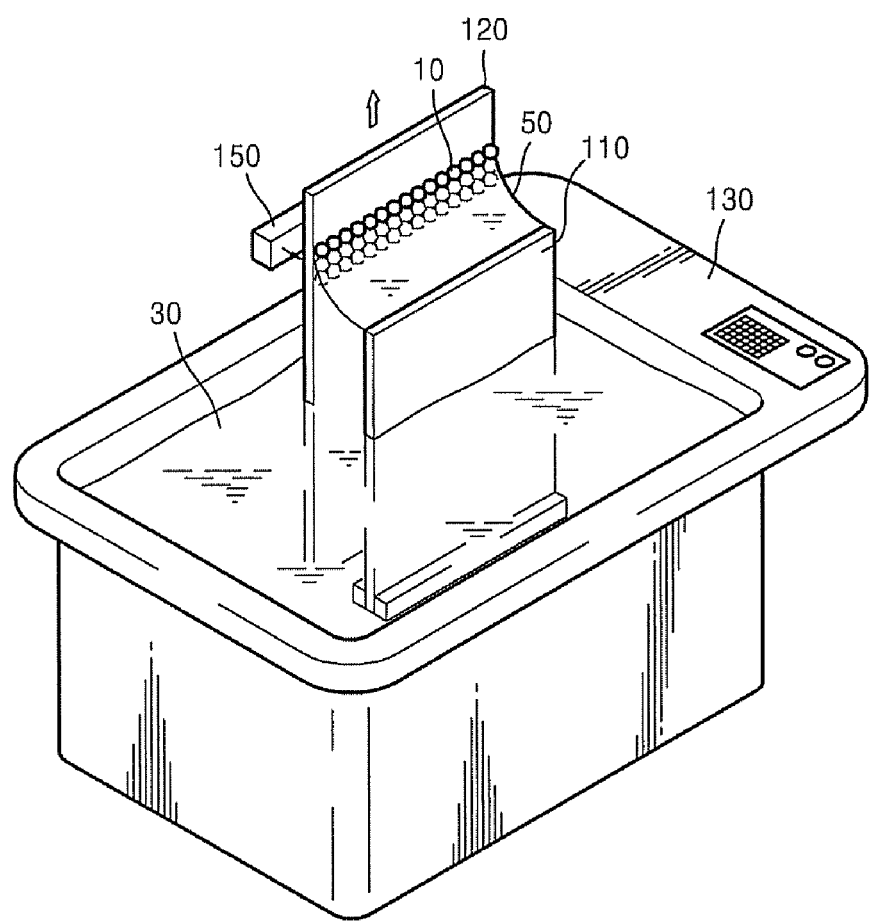
FIG. 4 is an exemplary schematic perspective view illustrating a convective assembly apparatus for forming a nano-particle array according to the embodiment of the present invention.

FIG. 4 is an exemplary schematic perspective view illustrating a convective assembly apparatus for forming a nano-particle array according to one embodiment of the present invention.

Referring to FIG. 4, a fixed substrate 110 and a mobile substrate 120 are disposed so as to face each other with a space therebetween for movement of one with respect to the other. The space between the two can be, for example, about 100 nm, and both the fixed substrate 110 and the mobile substrate 120 are partially immersed into a tank 130 containing a colloidal solution 30 where the nano-particles coated by the above-described process are dispersed. The mobile substrate 120 is raised from the tank at a constant speed and the nano-particles are adhere to the mobile substrate 120. Although not shown, a desired raising force is provided to the mobile substrate 120, for example, through a driving motor with a controlled rotational speed and a rack-pinion type gear assembly. For example, water may be used as a solvent in the colloidal solution 30, and a substrate made of a glass or silicon material with excellent wettability with respect to the colloidal solution 30 may be used as the fixed substrate 110 and the mobile substrate 120. A capillary force between the fixed substrate 110, the mobile substrate 120, causes the colloidal solution 30 to rise with the mobile substrate 120. An interface 50 in the form of a meniscus exists between the colloidal solution 30 and the atmosphere between the fixed substrate 110 and the mobile substrate 120. A liquid film that is relatively thin is formed at the front portion of the colloidal solution 30, so that the solvent is intensively evaporated. In the present embodiment, specifically, the surface of the colloidal solution 30 is locally heated, thereby accelerating the vaporization of the colloidal solution 30 as will be described later.

Figure 5:
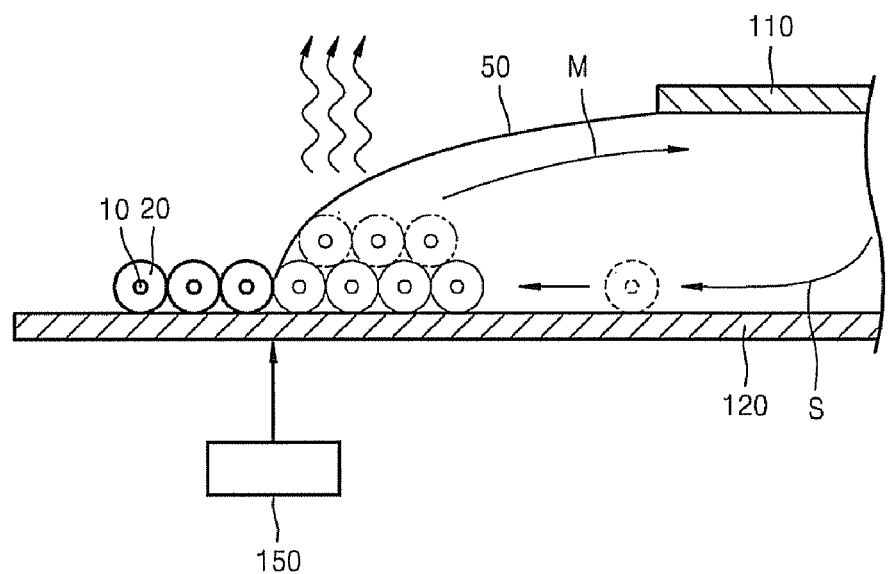
FIG. 5 is an exemplary enlarged sectional view illustrating the surface of a colloidal solution of FIG. 4.
Figure 6A:
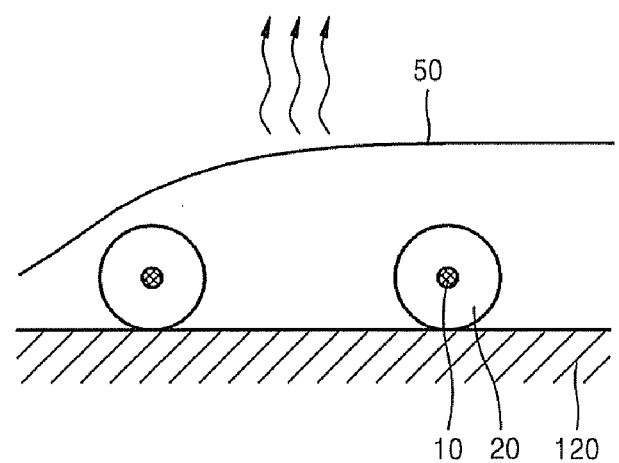
FIGS. 6A through 6D are exemplary views illustrating a process by which nano-particles positioned at the surface of the colloidal solution approach and cohere to one another, according to an embodiment of the present invention.
Figure 6B:
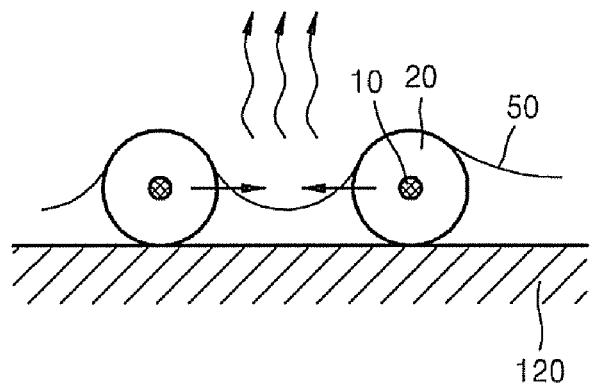
Figure 6C:
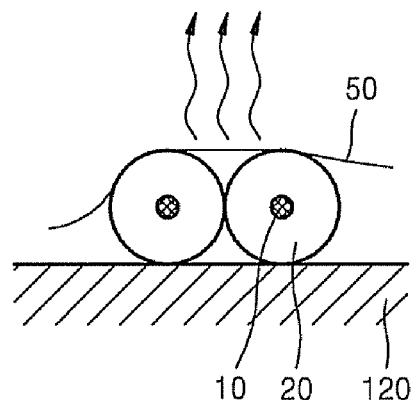
Figure 6D:
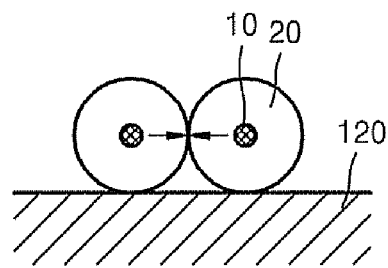

FIG. 5 is an enlarged sectional view illustrating the surface of the colloidal solution of FIG. 4, according to an embodiment of the present invention.

In FIG. 5, an exemplary sectional view of the surface of the colloidal solution is illustrated in detail. The interface 50 of the colloidal solution is formed between the mobile substrate 120 that is moved at a constant speed and the fixed substrate 110. On the mobile substrate 120, the colloidal solution is locally heated by a desired heat source 150. The localized heating is preferably performed by a light source such as a laser or a fluorescent lamp. For example, the wavelength of the laser is controlled to control the heating temperature of the colloidal solution. The colloidal solution is heated to a sufficiently high temperature such that the solvent vaporizes. For example, when water is used as the solvent, the vapor pressure is 3.169 kPa at a temperature of 300 k, and the vapor pressure is 15.758 kPa at a temperature of 330 k. Thus, when the heating temperature of the colloidal solution rises to about 30° C., the vaporization of the solvent occurs about 5 times faster than normal. However, if the heating temperature of the colloidal solution approaches the boiling point of the solvent, it is impossible to control the flow of the overheated colloidal solution. Thus, when water is used as the solvent of the colloidal solution, the heating temperature of the colloidal solution may be in a range of about 30° C. to 70° C., which is lower than the boiling point of water.

Since the solvent intensively evaporates at the front portion of the colloidal solution, a flow pattern labeled "S" flowing towards the front portion of the colloidal solution is generated inside the colloidal solution, as indicated by the arrows in FIG. 5. The flow S results from a Marangoni effect generated by the difference in surface tension at the interface 50 of the colloidal solution. As a result, the surface tension becomes low at the front portion of the colloidal solution, which is intensively locally heated. A Marangoni flow M is generated from the front portion of the colloidal solution to a low temperature region toward the rear portion of the colloidal solution where the surface tension is higher than the front portion of the colloidal solution. Multi-layered nano-particles 10, shown as a dotted line in FIG. 5, move towards the rear portion of the colloidal solution in the same direction as the Marangoni flow M, and mono-layered nano-particles are formed on the surface of the mobile substrate 120. Another flow S moving from the rear portion to front portion of the colloidal solution is generated in the lower part of the colloidal solution in contact with the mobile substrate 120, in order to compensate for the Marangoni flow M moving from the front portion to the rear portion. In the same direction as the flow S, the nano-particles 10 dispersed in the colloidal solution move towards the front portion of the colloidal solution, and are arrayed on the mobile substrate 120.

FIGS. 6A through 6D are exemplary views illustrating a process by which nano-particles positioned at the front portion of a colloidal solution approach and adhere to one another.

Referring to FIGS. 6A through 6D, as the solvent filling the spaces between the nano-particles 10 is vaporized, the interface 50 of the colloidal solution turns concave. The nano-particles 10 are drawn closer to one another due to the surface tension (lateral capillary force) in order to minimize the surface tension at the interface 50 of the colloidal solution. As the remaining colloidal solution filling the spaces between the nano-particles 10 vaporizes, the nano-particles 10 approach closer to one another and adhere to one another due to the van der Waals force as well as to the mobile substrate 120.

Figure 7A:
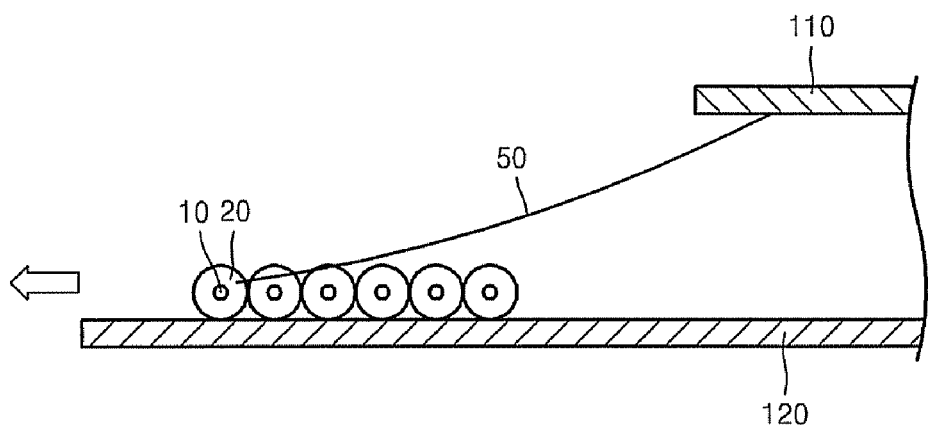
FIGS. 7A and 7B are exemplary views illustrating a pattern of a nano-particle array relative to a raising speed of a substrate, according to an embodiment of the present invention.
Figure 7B:
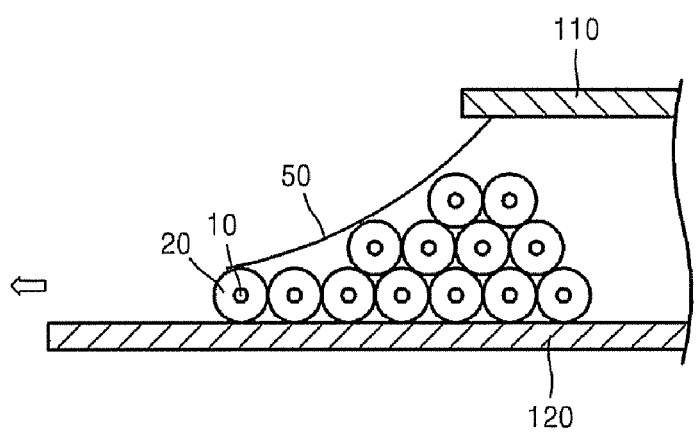

FIGS. 7A and 7B illustrate one pattern of a nano-particle array relative to the raising speed of the substrate, according to an embodiment of the present invention. That is, when the mobile substrate 120 is raised at a high rate of speed, the interface 50 of colloidal solution has a gently sloping shape and the nano-particles 10 are arrayed in a mono-layered (single layered) pattern. However, when the mobile substrate 120 is raised at a relatively slow speed, the shape of the interface 50 of the colloidal solution has a steep sloping shape from the fixed substrate 110 to the mobile substrate 120, and the nano-particles 10 are arrayed in a multi-layered pattern. Thus, the nano-particles 10 are arrayed in a mono-layered or multi-layered pattern by controlling the raising speed of the mobile substrate 120.

Figure 8:
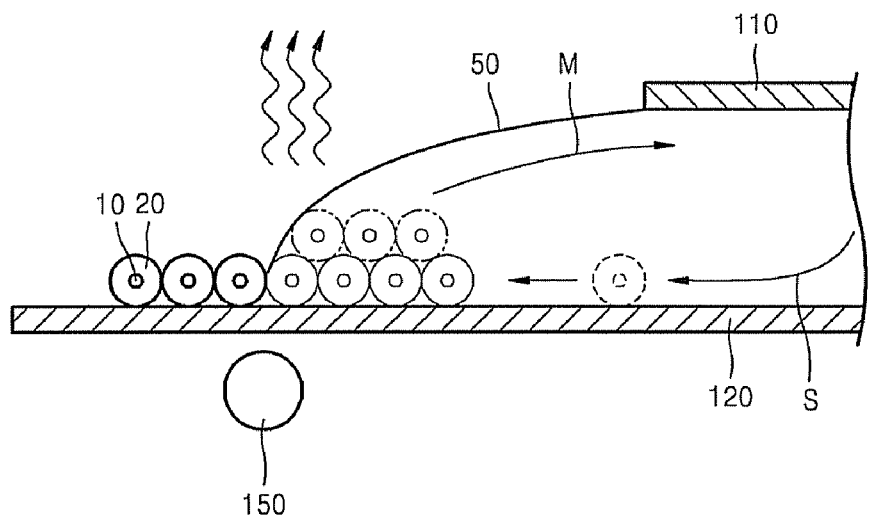
FIG. 8 is an exemplary sectional view illustrating a method of forming a nano-particle array according to another embodiment of the present invention.

FIG. 8 is a sectional view illustrating a method of forming a nano-particle array according to another embodiment of the present invention.

Referring to FIG. 8, an interface 50 of a colloidal solution is formed as a meniscus between a mobile substrate 120 that is moved at a constant speed and a fixed substrate 110. As the front portion of the colloidal solution is locally heated such the colloidal solution is intensively vaporized, a Marangoni flow M is generated along the interface 50 of the colloidal solution. Then, a flow S fills up an empty space due to the Marangoni flow M in order to maintain the flow of the colloidal solution, nano-particles 10 dispersed in the colloidal solution are continuously arrayed on the mobile substrate 120. In the present embodiment illustrated in FIG. 8, an electric resistance heating method is used in order to heat the front portion of the colloidal solution. Accordingly, an electrothermal wire is used as a heating unit 150 adjacent to the mobile substrate 120 corresponding to the front portion of the colloidal solution. Thus, an electric current transmitted through the electrothermal wire is controlled to control the heating of the colloidal solution.

In the present embodiment, a feedback control mechanism (not shown) may be applied in order to regularly maintain the vaporization speed of the colloidal solution. The feedback control mechanism measures vapor pressure of the solvent at the front portion of the colloidal solution. That is, when the vapor pressure is lower than a predetermined optimum level, the feedback control mechanism increases the heat supplied from the heat source or slows down the raising speed of the mobile substrate, so that the speed of the vaporization increases.

Figure 9:
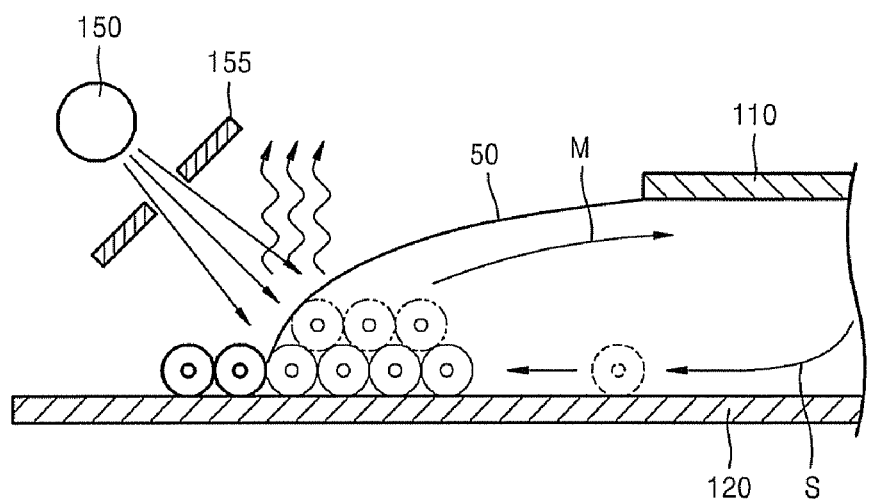
FIG. 9 is an exemplary sectional view illustrating a method of forming a nano-particle array according to another embodiment of the present invention.

FIG. 9 illustrates a method of forming a nano-particle array according to another embodiment of the present invention.

An interface 50 of a colloidal solution is formed between a fixed substrate 110 and a mobile substrate 120, which is facing the fixed substrate 110 in parallel and that is moved at a constant speed. In the embodiment of FIG. 9, a surface of the colloidal solution is locally heated by radiation. A filament or an incandescent lamp including the filament may be used as a heating unit 150. A region where radiant energy is emitted is limited to the front portion of the colloidal solution. A slit 155 may be arranged in a heat radiation path of the heating unit 150, to focus the radiant energy. The amount of radiant energy can be precisely controlled by the slit 155, thereby focusing the high-density radiant energy on the front portion of the colloidal solution.

Figure 10:
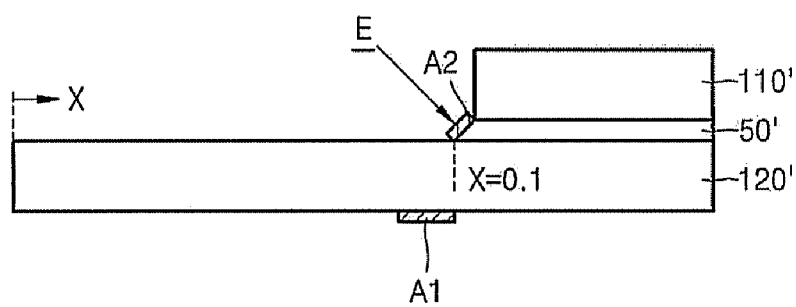
FIG. 10 is an exemplary view illustrating a simulation model for performing thermal analysis in different heating modes on the convective assembly apparatus, according to an embodiment of the present invention.

FIG. 10 illustrates a simulation model for performing thermal analysis in different heating modes on the convective assembly apparatus of the present invention, according to an embodiment of the present invention.

Referring to FIG. 10, a liquid film 50' having a desired thickness is formed between a fixed substrate 110' and a mobile substrate 120'. The distance between the substrates dictates the thickness of the film. The substrates 110' and 120' are made of a glass material having a thermal conductivity of 10 W/m²K. The liquid film 50' is formed of a colloidal solution including a plurality of nano-particles, and has a thickness of 100 μm. The analysis is conducted with respect to Case 1 and Case 2, discussed below, both of which have different input heat conditions. In Case 1, heat is input by radiation from above the mobile substrate 120', and the heat flux is 50 kW/m². In Case 2, heat is input by conduction from below the mobile substrate 120', the length of the heat input (A1) is 100 μm, and the heat flux is 100 kW/m². In FIG. 10, A1 and A2 indicate the length of the heat input in Case 1 and Case 2, respectively.

In the analysis, the effect of a flow formed inside the liquid film 50' is disregarded. Since the heat transfer speed actually reaches $10^5$ times more than the flow speed of the colloidal solution, the flow speed of the solution may be disregarded for the analysis of the heat transfer.

Figure 11A:
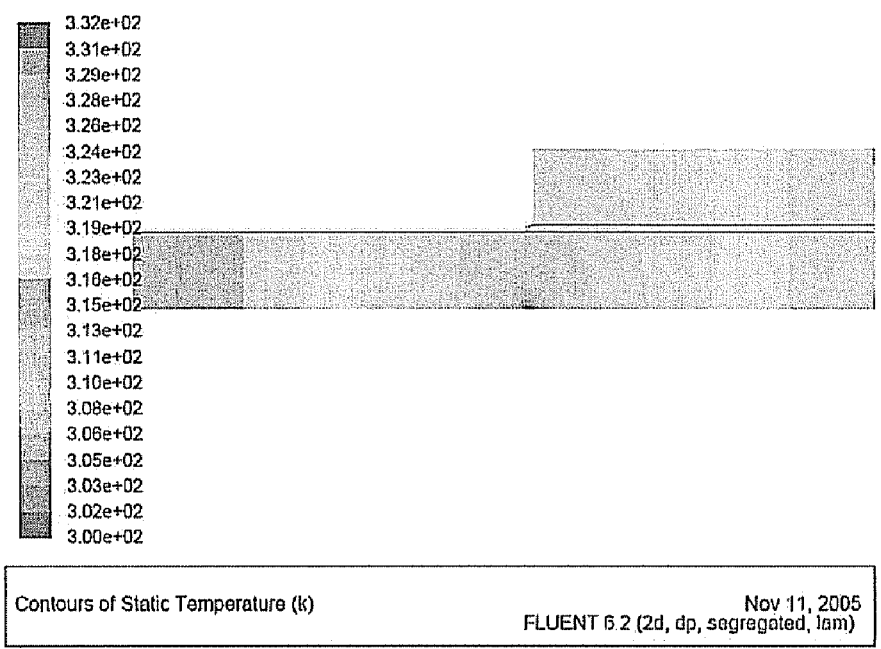
FIGS. 11A and 11B are exemplary views illustrating a temperature distribution of a convective assembly system when conduction and radiation are applied to the convective assembly system.
Figure 11B:
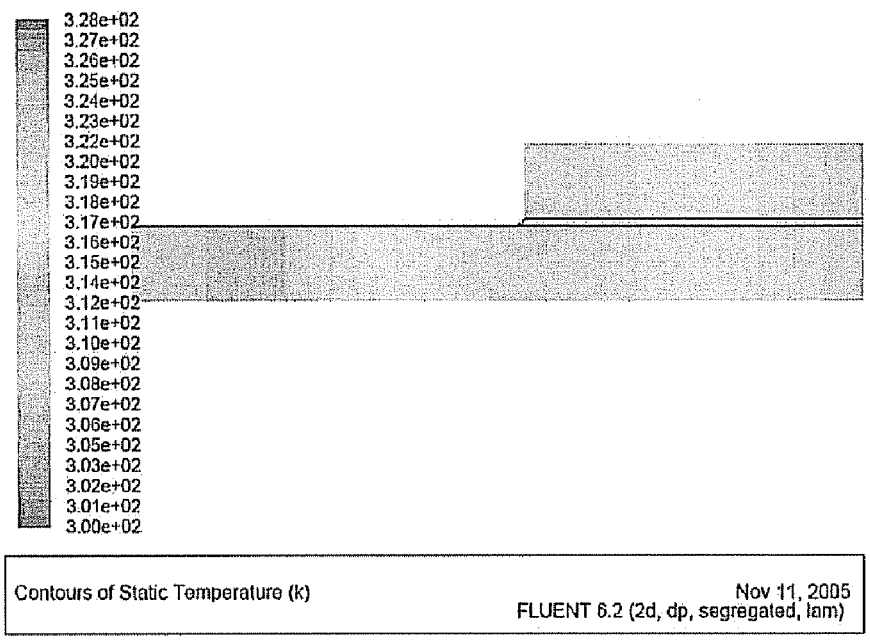

FIGS. 11A and 11B are views illustrating a temperature distribution of a convective assembly system when conduction and radiation are applied to the convective assembly system.

FIG. 11A shows the temperature distribution of Case 1 due to radiant heat, and FIG. 11B shows the temperature distribution of Case 2 due to conductive heat. Referring to FIGS. 11A and 11B, it can be expected that the temperature is high at the front portion of the liquid film 50' and thus, vaporization occurs intensively at the front portion.

Figure 12:
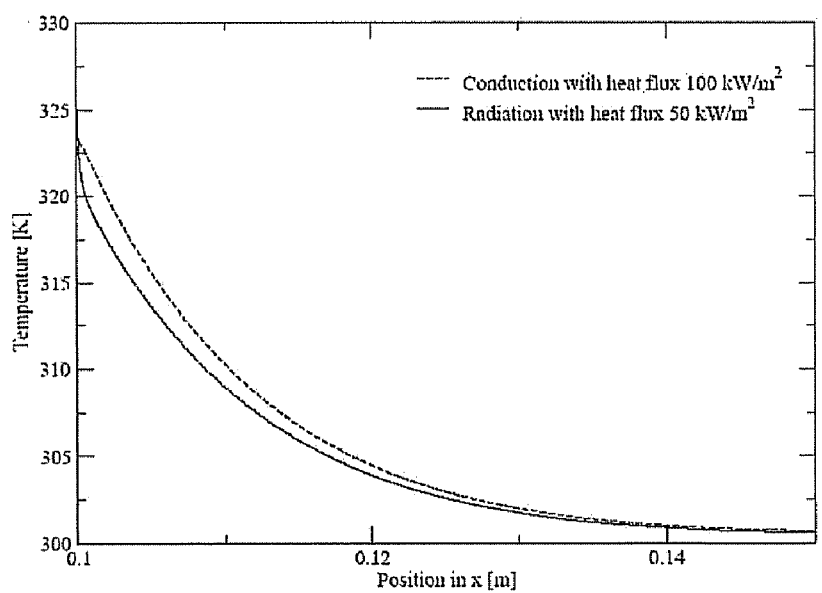
FIG. 12 is an exemplary view illustrating a temperature distribution according to a position of a substrate, according to an embodiment of the present invention.

FIG. 12 is a view illustrating a temperature distribution according to a position of a substrate, according to an embodiment of the present invention.

Referring to FIG. 12, the temperature distribution of Case 1 due to the radiant heat and Case 2 due to the conductive heat, which illustrates the temperature in accordance with a position in the length (x) of the substrate, i.e., on the abscissa. When comparing the temperature distribution of Case 1 and Case 2, there is no big difference except for the slight difference in temperature at the front portion of the liquid film, i.e., x=0.1, on the abscissa. Considering that the heat flux (50 kW/m$^2$) of Case 2 is half the heat flux (100 kW/m$^2$) of Case 1, it is concluded that the heating by the conducting heat in Case 2 is more effective.

Figure 13:
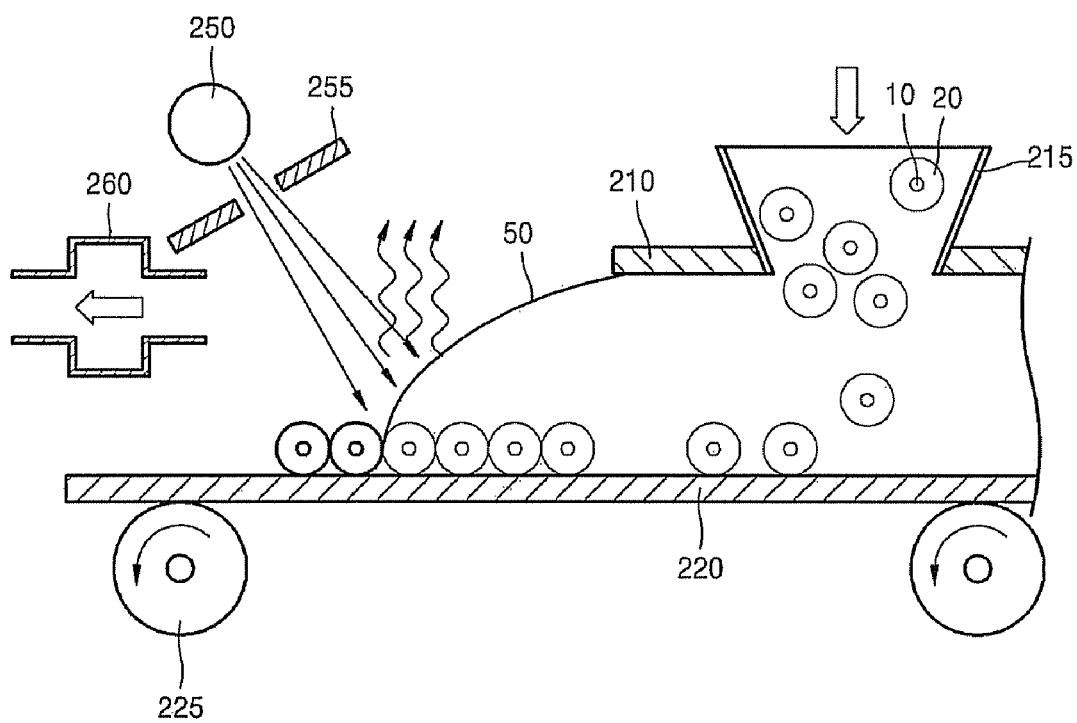
FIG. 13 is an exemplary view illustrating a sectional structure of a convective assembly apparatus for a nano-particle array, according to another embodiment of the present invention.

FIG. 13 illustrates an exemplary sectional structure of a convective assembly apparatus for a nano-particle array according to another embodiment of the present invention.

Referring to FIG. 13, a fixed cover 210 and a sliding substrate 220 that is able to be moved at a constant speed are arranged to face each other spaced apart at a predetermined distance to allow movement relative to each other. The fixed cover 210 includes an opening 215 in a flare shape, for supplying a colloidal solution. The opening 215 is connected to a solution tank (not shown) through a pipe (not shown), for continuously supplying the colloidal solution in the space between the fixed cover 210 and the sliding substrate 220 when the sliding substrate 220 moves relative to the fixed cover 210.

The sliding substrate 220 moves at a constant speed by a driving roller 225 rotating the sliding substrate 220 in one direction. A heating unit 250 for supplying a desired radiant heat to the front portion of the colloidal solution may be positioned above the sliding substrate 220 as shown in the FIG. 13. The heat unit 250, such as an electrothermal wire, may be positioned under the sliding substrate as shown. The heating unit 250 locally heats the front portion of the colloidal solution. Then, nano-particles are uniformly arrayed on the sliding substrate 220 due to the vaporization of the solvent and the Marangoni flow. In FIG. 13, an exhaust passage 260 allows the vaporized gas of the solvent to be exhausted.

Figure 14:
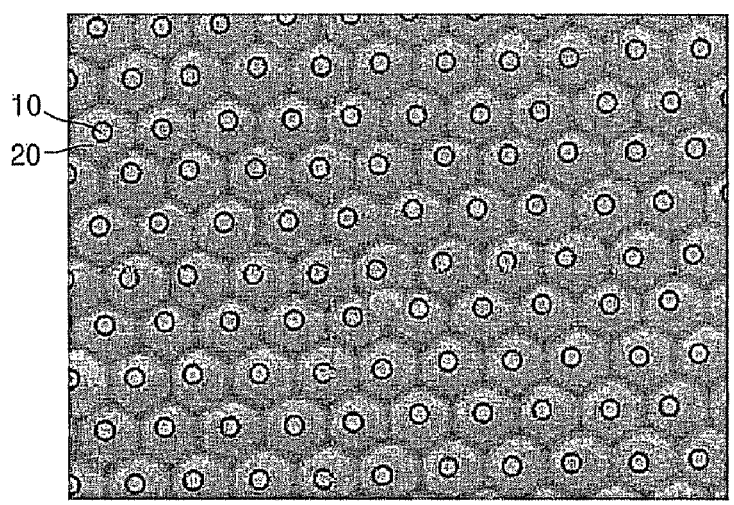
FIG. 14 is an exemplary plan view illustrating the nano-particle array obtained by the method according to the present invention.

FIG. 14 is a plan view illustrating a pattern of the nano-particle array obtained by the method according to the present invention.

The nano-particles 10 enclosed by the coating layer 20 are adhered closely to one another and arrayed closely together.

Figure 15A:
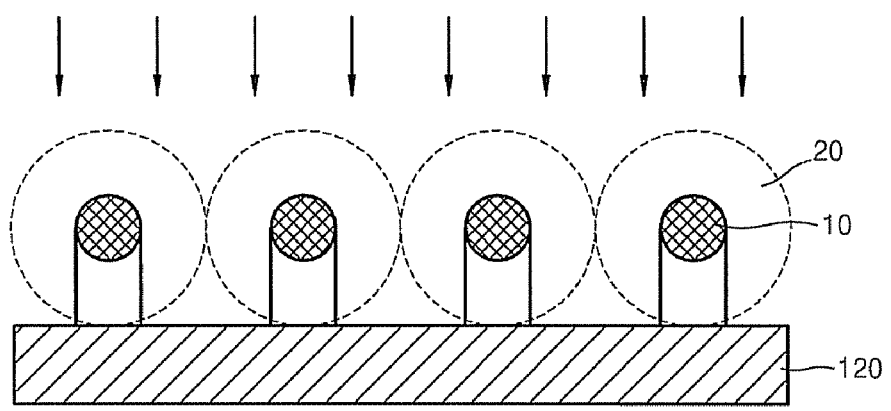
FIGS. 15A and 15B are exemplary sectional views illustrating a post process performed after the nano-particles are arrayed using the convective assembly apparatus, according to an embodiment of the present invention.
Figure 15B:
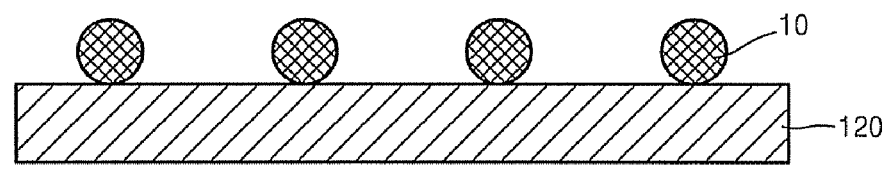

FIGS. 15A and 15B are sectional views illustrating a post-process performed after the nano-particles 10 are arrayed on the mobile substrate 120 using the convective assembly apparatus, according to an embodiment of the present invention.

Note, the post-process may be performed as desired. Referring to FIG. 15A, a part of the coating layer 20 formed on the surface of the nano-particles 10 is removed by dry etching such as plasma etching. In plasma etching, a vertically accelerated plasma ion particle can be used to selectively etch a portion of the coating layer 20 between the nano-particles 10. An etching mask can be used if desired. When the coating layer 20 is removed, the nano-particles 10 are arrayed in regular intervals. The thickness of the coating layer 20 is controlled to control the distance between the nano-particles 10. This means that the nano-particles 10 can be uniformly arrayed as required.

FIG. 15B illustrates when the nano-particles 10 are on the substrate 120 by performing a wet etching and a pyrolysis process. The wet etching process is chemically performed by using an etching solution that selectively reacts with certain species in the coating layer. The pyrolysis process burns selected residual portions, which are to be removed, after the wet-etching process. In this case, since the distance between the nano-particles 10 correlates to the thickness of the coating layer, the nano-particles 10 are uniformly arrayed on a large area substrate by controlling the thickness of the coating layer.

According to the method of forming a nano-particle array by convective assembly in the present embodiment of the present invention, the nano-particles having a particle size from a few to several tens of nanometers are uniformly or regularly arrayed. Since a pre-process of forming a coating layer on the nano-particles is performed, the convective assembly can be applied with respect to the nano-particles having a particle size from a few to several tens of nanometers with the advantage that a nano-particle monolayer or multi-layer can be obtained through a relatively simple process. Specifically, the array of nano-particles is uniformly arrayed on a large area substrate, and can be formed by suitably controlling the thickness of the coating layer of the nano-particles.

Further, in the present invention, since the method of locally heating the front portion of the colloidal solution by conduction or radiation is used for vaporizing the colloidal solution including the nano-particles, it is possible to structurally prevent the nano-particle array from splitting due to any physical impact. Since only the front portion of the colloid solution is intensively heated, a flow of the colloidal solution can be generated to benefit the nano-particle array.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of forming a nano-particle array by convective assembly, comprising:
    coating a plurality of nano-particles to form a coating layer on the nano-particles;
    performing a first convective assembly by moving a first substrate facing, in parallel and spaced apart from a second substrate at a desired distance such that a colloidal solution comprising coated nano-particles is drawn into a space between the first and second substrate;
    performing a second convective assembly for evaporating a solvent by locally heating a front portion of the colloidal solution drawn by one of conductive heat and radiant heat when the first substrate is moved in parallel relative to the second substrate, and
    removing at least a part of the coating layer enclosing the nano-particles,
    wherein a distance between the nano-particles depends on a thickness of the coating layer disposed upon the nano-particles so that the nano-particles are uniformly arrayed in a regular interval and the distance is twice the thickness of the coating layer.

2. The method of claim 1, wherein the coating layer enclosing the nano-particles is a dispersant or surfactant such that the nano-particles do not adhere to each other and are regularly dispersed in the colloidal solution.

3. The method of claim 1, wherein the coating is performed by first forming a primer layer as a seed upon the nano-particles for growing the coating layer.

4. The method of claim 1, wherein the performing of the second convective assembly by locally heating the front portion of the colloidal solution is performed by conductive heat transferred under the first substrate.

5. The method of claim 4, wherein a laser light source or a fluorescent lamp for emitting light energy to the first substrate is positioned under the first substrate.

6. The method of claim 4, wherein an electrothermal wire transmitting a desired current to heat the first substrate is positioned under the first substrate.

7. The method of claim 1, wherein the performing of the second convective assembly by locally heating the front portion of the colloidal solution is performed by radiant heat transferred from above the first substrate.

8. The method of claim 7, wherein a filament or an incandescent lamp to emit direct radiant energy to the front portion of the colloidal solution is positioned above the first substrate.

9. The method of claim 8, wherein a slit is positioned in a path through which the radiant energy is emitted and wherein the slit can be used to focus the radiant energy.

10. The method of claim 1, wherein the first substrate and the second substrate are partially immersed in a tank with the colloidal solution comprising the nano-particles, and the first substrate is pulled relative to the second substrate at a constant speed.

11. The method of claim 1, wherein the first substrate and the second substrate are positioned to be spaced apart and to face each other in parallel, the second substrate, which is positioned above the first substrate, includes an opening for supplying the colloidal solution in a space between the first substrate and the second substrate, and the first substrate, which is positioned under the second substrate, is moved at a constant speed relative to the second substrate by a rotating driving roller.

12. The method of claim 1, further comprising a post-process performed by etching with respect to the nano-particle array formed on the first substrate, so that at least a part of the coating layer enclosing the nano-particles is removed.

13. The method of claim 12, wherein the post-process is performed by carrying out dry-etching with respect to the nano-particle array, and the coating layer is etched vertically.

14. The method of claim 12, wherein the post-process is performed by sequentially carrying out wet-etching and pyrolysis with respect to the nano-particle array.

15. The method of claim 1, wherein the nano-particle is a quantum dot having a core-shell structure or a homogeneous single structure.

16. The method of claim 1, wherein the nano-particle is a metallic particle selected from the group consisting of Au, Ag, Fe, Co, Ni and Pd.

* * * * *